US012679742B2

(12) United States Patent
Warkentin et al.

(10) Patent No.: US 12,679,742 B2
(45) Date of Patent: Jul. 14, 2026

(54) PROCESS FOR THE PURIFICATION OF MANGANESE SULFATE SOLUTIONS AND SUBSEQUENT CRYSTALLIZATION OF HIGH PURITY MANGANESE SULFATE MONOHYDRATE

(71) Applicant: Manganese X Energy Corp., Saint-Laurent (CA)

(72) Inventors: Douglas D. Warkentin, Burnaby (CA); Anca M. Nacu, Vancouver (CA)

(73) Assignee: MANGANESE X ENERGY CORP., Saint-Laurent (CA)

( * ) Notice: Subject to any disclaimer, the term of this patent is extended or adjusted under 35 U.S.C. 154(b) by 508 days.

(21) Appl. No.: 18/368,485

(22) Filed: Sep. 14, 2023

(65) Prior Publication Data

US 2024/0092654 A1     Mar. 21, 2024

Related U.S. Application Data

(60) Provisional application No. 63/407,251, filed on Sep. 16, 2022.

(51) Int. Cl.
| | |
|---|---|
| *C01G 45/10* | (2006.01) |
| *B01D 9/00* | (2006.01) |
| *C01G 45/06* | (2025.01) |

(52) U.S. Cl.
CPC ........... *C01G 45/10* (2013.01); *B01D 9/0036* (2013.01); *C01G 45/06* (2013.01); *B01D 2009/0086* (2013.01); *C01P 2006/80* (2013.01)

(58) Field of Classification Search
CPC ...... C01G 45/10; C01G 45/06; B01D 9/0036; B01D 2009/0086; B01D 9/0045;
(Continued)

(56) References Cited

U.S. PATENT DOCUMENTS

| | | |
|---|---|---|
| 7,524,480 B2 | 4/2009 | Oka et al. |
| 10,858,264 B2 | 12/2020 | Liu et al. |

FOREIGN PATENT DOCUMENTS

| | | |
|---|---|---|
| CN | 101224908 A | 7/2008 |
| CN | 101318706 A | 12/2008 |

(Continued)

OTHER PUBLICATIONS

Machine translation of CN-109704408-A (Year: 2019).*

(Continued)

*Primary Examiner* — Anthony J Zimmer
*Assistant Examiner* — Logan LaClair
(74) *Attorney, Agent, or Firm* — David J. McGruder; Oyen Wiggs Green & Mutala LLP

(57) ABSTRACT

A process for purifying a manganese sulfate solution and precipitating high purity manganese sulfate monohydrate crystals. The concentration of manganese sulfate is increased and calcium and magnesium are removed by precipitating calcium and magnesium fluoride, which are separated from the concentrated solution to produce a clarified solution. In a first crystallization step, the clarified solution is combined with a recycled manganese sulfate solution and manganese sulfate seed crystals and the mixture is heated to produce a crystal suspension. Manganese sulfate crystals are separated and the remaining solution is used to prepare solid manganese fluoride, which is separated and returned to the process to remove calcium and magnesium. The manganese sulfate crystals are redissolved in water. Undissolved solids are removed to produce a second clarified manganese sulfate solution. In a second crystallization step the second clarified solution is combined with manganese sulfate monohydrate seed crystals, which are heated and mixed to produce a manganese sulfate monohydrate crystal product in a saturated manganese sulfate solution, (Continued)

from which the final high purity manganese sulfate mono-hydrate crystals are separated.

29 Claims, 1 Drawing Sheet

(58) Field of Classification Search
CPC .... B01D 9/0031; B01D 9/005; B01D 9/0059;
C01P 2006/80
See application file for complete search history.

(56) References Cited

FOREIGN PATENT DOCUMENTS

| | | | |
|---|---|---|---|
| CN | 101412543 A | 4/2009 | |
| CN | 101508467 A | 8/2009 | |
| CN | 101698514 A | 4/2010 | |
| CN | 102070198 B | 9/2012 | |
| CN | 101875507 B | 10/2012 | |
| CN | 102923783 A | 2/2013 | |
| CN | 103011297 A | 4/2013 | |
| CN | 103112901 A | 5/2013 | |
| CN | 103496746 A | 1/2014 | |
| CN | 105481020 A | 4/2016 | |
| CN | 105502505 A | 4/2016 | |
| CN | 106145199 A | 11/2016 | |
| CN | 106395909 A * | 2/2017 | ............. C01G 45/06 |
| CN | 106756023 A | 5/2017 | |
| CN | 109704408 A * | 5/2019 | |
| CN | 110157911 A | 8/2019 | |
| CN | 110983039 A | 4/2020 | |
| CN | 111944999 A * | 11/2020 | ............. C22B 47/00 |
| EP | 3967660 A2 | 3/2022 | |
| WO | WO-2022094706 A1 * | 5/2022 | ......... C22B 47/0063 |

OTHER PUBLICATIONS

Machine translation of CN-111944999-A (Year: 2020).*
Machine translation of CN-106395909-A (Year: 2017).*
Chenli, Z., Lian, F., and Ma, L., A novel method to remove Ca2+ and Mg2+ impurities from manganese sulfate solution. (Proceedings of the 5th International Conference on Measurement, Instrumentation and Automation (ICMIA 2016)).

* cited by examiner

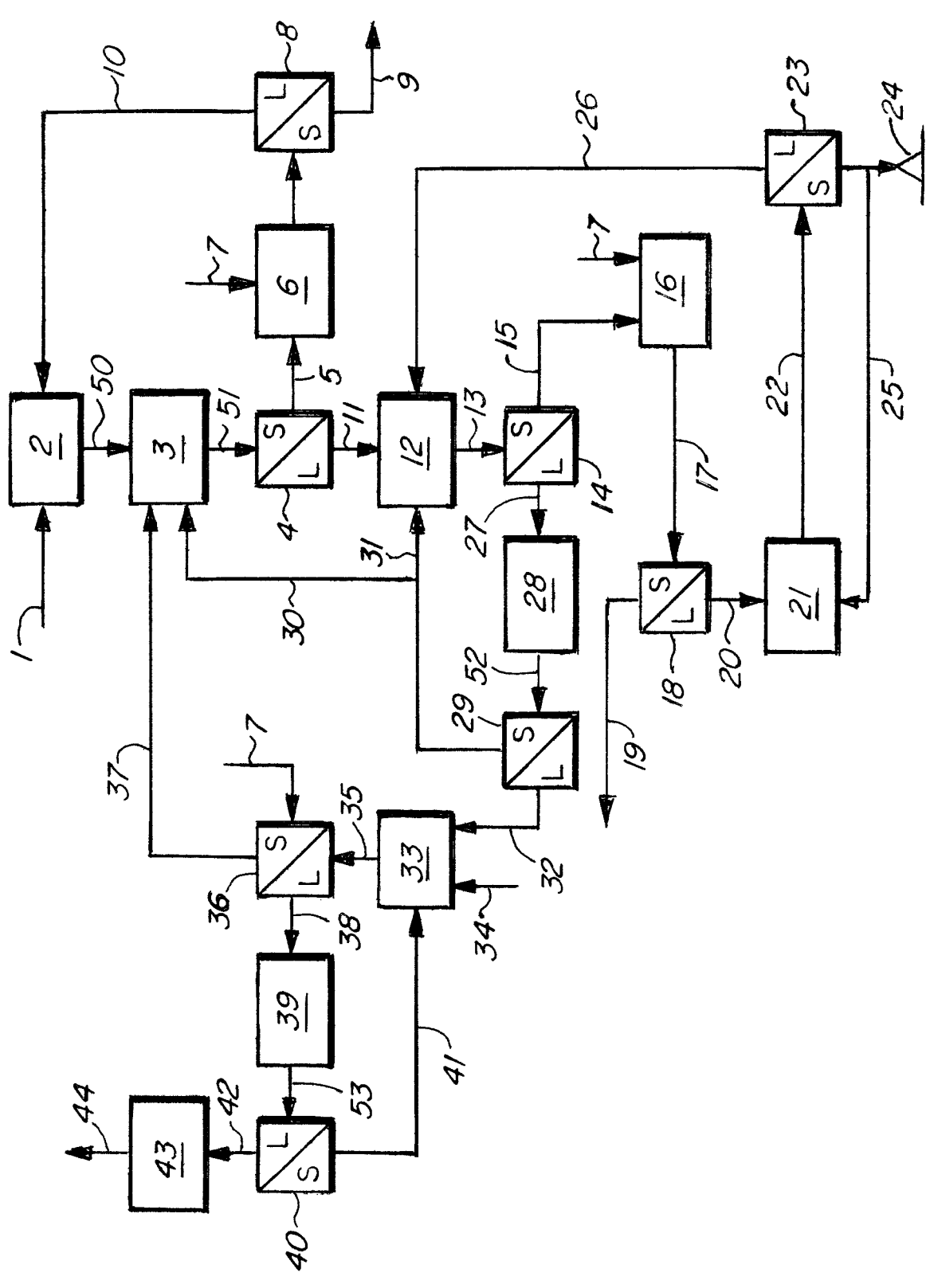

PROCESS FOR THE PURIFICATION OF MANGANESE SULFATE SOLUTIONS AND SUBSEQUENT CRYSTALLIZATION OF HIGH PURITY MANGANESE SULFATE MONOHYDRATE

TECHNICAL FIELD

The present invention pertains to the purification of process solutions containing manganese sulfate for the purpose of crystallizing high purity manganese sulfate monohydrate products from the purified solutions.

BACKGROUND OF THE INVENTION

Manganese is an important industrial metal which is used in many forms, principally derived from naturally occurring ores. Increasing demand for high purity manganese feedstocks for technical applications such as battery manufacture requires effective purification processes to upgrade lower purity sources. While manganese is an abundant element in nature, its principal use has been as an input for steelmaking, for which it is mined in large quantities from high grade deposits and often shipped as mined, or with minimal processing. For steelmaking, the raw ore is first converted into ferromanganese or silicomanganese through pyrometallurgical processing, or into electrolytic manganese metal through reduction roasting, followed by a hydrometallurgical process and electroplating from solution.

In high grade ores, the manganese most commonly occurs in oxide minerals such as pyrolusite, or $MnO_2$, where manganese is in the +4 oxidation state and must be reduced either to the metallic state through smelting for use in steelmaking, or to the +2 oxidation state for leaching and further upgrading. Manganese also occurs in a range of more complex oxide and silicate minerals and can more rarely occur in commercial quantities as rhodochrosite ($MnCO_3$), where the manganese is in the +2 oxidation state and can be leached directly in acid.

For industrial uses of manganese aside from steelmaking, the standard practice is to generate leached manganese in the +2 state with sulfuric acid to produce manganese sulfate solution, which is cleaned and upgraded as required, and used as feedstock for the preparation of a range of manganese products, including manganese sulfate, manganese dioxide and manganese metal. These products require differing levels of purity depending on their end use. They are typically upgraded through precipitation of impurities such as iron and aluminum by pH adjustment, often followed by removal of other base metals through precipitation with a sulfide reagent. If further upgrading is needed the manganese is first precipitated from solution as $MnCO_3$ and then redissolved in sulfuric acid to produce the desired concentration of clean manganese sulfate solution.

In addition to being used as a feedstock for the preparation of other manganese products, manganese sulfate can be an end product in itself. In the past this has primarily been for fertilizer and other chemical uses, where impurity levels are not typically critical, particularly for environmentally benign contaminants such as calcium and magnesium. However, in recent years demand has grown for high purity manganese sulfate monohydrate (HPMSM), and this demand is expected to grow rapidly due to its use in electric vehicle battery cathode production. To date the demand for HPMSM has been met through several existing processes, each of which has its own challenges.

The most common process to produce HPMSM is through the initial creation of a partially purified manganese sulfate solution as feedstock for high purity electrolytic manganese metal (HPEMM) production. The HPEMM product is then redissolved in sulfuric acid to produce a manganese sulfate solution with low impurities, from which HPMSM can be prepared using conventional crystallization techniques. The plating of HPEMM is significantly more costly than that of conventional electrolytic manganese metal (EMM), as additives used to increase plating efficiency such as chromium and selenium cannot be used for making high purity material, adding significantly to process costs.

Other processes produce HPMSM directly from manganese sulfate solutions that have been generated directly from manganese ores, but multiple cleaning stages are required to remove impurities prior to the final crystallization stages, which adds to costs. These direct leach processes may also require a significant fraction of the manganese to be bled to a waste stream, or to a higher impurity manganese sulfate product for lower value uses.

Manganese used for producing HPMSM may be sourced from either oxide or carbonate ores, or from wastes such as process tailings from current or past mineral processing operations. Oxide minerals (with manganese in the +3 or +4 oxidation state) must be reduced before leaching with sulfuric acid. This is accomplished either through reductive roasting in the temperature range of 450-600° C., or through addition of a chemical reducing agent such as sulfur dioxide (equation 1) to the sulfuric acid leach. Carbonate minerals (with manganese in the +2 oxidation state) are leached directly with sulfuric acid to produce a manganese sulfate solution (equation 2). Manganese sulfate leach solutions generated directly from ore or waste material will typically also contain other soluble cations leached from the feed material and a high degree of impurity removal is required to produce a manganese sulfate solution suitable for crystallization of HPMSM.

$$MnO_2+H_2SO_3 \leftrightarrow MnSO_4+H_2O \tag{1}$$

$$MnCO_3+H_2SO_4 \leftrightarrow MnSO_4+H_2O+CO_2 \tag{2}$$

There are several approaches to purification of manganese sulfate which typically include multiple stages of impurity precipitation and may include precipitation, oxidation or reduction and redissolution of manganese. In general, initial stages of purification involve removal of base metals through pH adjustment and hydrolysis or through the precipitation of insoluble metal sulfides, or a combination of these methods. Neutralization of the raw leach solution and oxidation of ferrous iron allows removal of aluminum and iron from solution (equations 3 and 4). Oxidation of iron may be achieved by air or oxygen addition, or by addition of stronger oxidants such as ozone or peroxide, with the pH and oxidant dosing closely controlled to minimize manganese oxidation.

$$Al_2(SO_4)_3+6H_2O \leftrightarrow 2Al(OH)_3+3H_2SO_4 \tag{3}$$

$$4FeSO_4+10H_2O+O_2 \leftrightarrow Fe(OH)_3+H_2SO_4 \tag{4}$$

Additional purification stages are dependent on the type and quantity of contaminants that have been leached from the feed material. With many ores and wastes the leach solution will contain base metals such as copper, lead, zinc, nickel, or cobalt, which are deleterious to later purification stages and must be removed prior to final upgrading. These metals, if present, are most commonly removed from the leach solution through the addition of a sulfide reagent such as sodium sulfide, sodium hydrosulfide or calcium hydrosulfide to form insoluble metal sulfides (equation 5, where M is a divalent base metal forming an insoluble metal sulfide).

$$MSO_4+Na_2S \leftrightarrow MS+Na_2SO_4 \qquad (5)$$

Manganese leach solutions cleaned of ferrous and non-ferrous metal contaminants typically still contain significant concentrations of alkaline and alkaline earth metals which must be removed before HPMSM can be crystallized. Methods used in practice or reported in the literature consist of electrolytically plating and then redissolving manganese metal, precipitating and redissolving a manganese compound or precipitating alkaline earth metals to further purify the original manganese leach solution.

For processes that utilize manganese metal as an intermediate product, the metal is plated as a high purity product (overall reaction, equation 6), with no additives to increase current efficiency. Current efficiency can be greater than 80% with additives but as little as 60% without them. Dissolution of the HPEMM to generate manganese sulfate solution suitable for crystallization follows the reverse reaction and requires sulfuric acid and the presence of oxygen or another oxidant (equation 7).

$$2MnSO_4+2H_2O \leftrightarrow 2Mn+2H_2SO_4+O_2 \qquad (6)$$

$$2Mn+2H_2SO_4+O_2 \leftrightarrow 2MnSO_4+2H_2O \qquad (7)$$

Another approach for completing the purification of manganese sulfate solution is to precipitate the manganese from solution as an insoluble carbonate compound (equation 8) through the addition of a soluble carbonate reagent, washing the resulting solid precipitate to remove soluble salts, and redissolving the solids in sulfuric acid to produce a manganese sulfate solution for crystallization (equation 9).

$$MnSO_4+Na_2CO_3 \leftrightarrow MnCO_3+Na_2SO_4 \qquad (8)$$

$$MnCO_3+H_2SO_4 \leftrightarrow MnSO_4+H_2O+CO_2 \qquad (9)$$

In any process that does not rely on the intermediate production of manganese metal, a principal challenge for purification is the removal of alkaline earth metals, especially calcium and magnesium, from the purified manganese sulfate solutions. The similarity in solubility characteristics between salts of these elements and those of manganese creates challenges for achieving target product purity. To address this, one method described in the literature is the precipitation of magnesium and calcium as insoluble fluoride compounds through the addition of a more soluble fluoride reagent such as ammonium fluoride (equations 10 and 11) or barium fluoride. Both of these compounds are significantly less soluble than the manganese fluoride and can therefore be precipitated from manganese sulfate solutions.

$$CaSO_4+2NH_4F \leftrightarrow CaF_2+(NH_4)_2SO_4 \qquad (10)$$

$$MgSO_4+2NH_4F \leftrightarrow MgF_2+(NH_4)_2SO_4 \qquad (11)$$

When adding a fluoride reagent, the calcium and magnesium in solution are replaced with the fluoride reagent cation (NH4+ in equations 10 and 11). The resulting salt must also be removed to prepare a pure manganese sulfate solution. Due to its high solubility, ammonium sulfate can be separated through precipitation and washing of manganese carbonate, with some potential for recovery of byproduct value, but at significant additional cost.

With the use of barium fluoride, the resulting barium sulfate (for example, equation 12) is insoluble and will precipitate with the fluoride compounds leaving a clean manganese sulfate solution; however, barium fluoride is a more expensive fluoride source due to the lower fluoride content by weight than ammonium fluoride. Also, precipitation of a mixed waste product containing fluoride and sulfate compounds makes recovery of value from this product more difficult.

$$MgSO_4+BaF_2 \leftrightarrow MgF_2+BaSO_4 \qquad (12)$$

Manganese fluoride can also be precipitated from concentrated manganese sulfate solutions where there is sufficient fluoride in solution (equation 13), but under ambient temperature conditions the solubility of the fluoride compound is approximately 100 times higher than that of magnesium fluoride, which is in turn more than four times higher than that of calcium fluoride. By limiting fluoride dosage, therefore, it is possible to remove calcium and magnesium to low levels while any manganese fluoride formed remains soluble.

$$MnSO_4+2NH_4F \leftrightarrow MnF_2+(NH_4)_2SO_4 \qquad (13)$$

Due to its higher solubility, the addition of solid manganese fluoride to a solution containing calcium or magnesium salts will result in the dissolution of the manganese fluoride and precipitation of calcium and magnesium fluorides (equation 14). This results in an increase in manganese sulfate concentration in the solution.

$$MgSO_4+MnF_2 \leftrightarrow MgF_2+MnSO_4 \qquad (14)$$

Typically, after purification steps have been employed to prepare a near saturation manganese sulfate solution with very low levels of impurities, the final HPMSM product is generated through crystallization at elevated temperature. Evaporation is employed, if required, to increase the manganese sulfate concentration beyond saturation, allowing crystallization of the product. In the solid form, manganese sulfate can carry different amounts of hydration depending on temperature. HPMSM is therefore crystallized at temperatures between 60 and 110° C. where the monohydrate form is stable and crystallizes preferentially. Crystals thus generated are then separated from the saturated mother liquor by established solid-liquid separation methods, including centrifuging, settling and filtration, before drying of the separated crystals to produce a final HPMSM product. However, conventional methods of production may require excessive washing steps and high bleed or wasting of impure manganese sulfate to achieve the required product purity.

It would be desirable to provide a process for producing HPMSM from manganese sulfate solutions that reduces the disadvantages of prior art processes.

SUMMARY OF THE INVENTION

According to one aspect of the invention, there is provided a process for purifying a manganese sulfate solution and precipitating high purity manganese sulfate monohydrate crystals therefrom, comprising the steps of: (a) increasing the concentration of manganese sulfate in the manganese sulfate solution to produce a concentrated manganese sulfate solution; (b) removing calcium and magnesium from the concentrated manganese sulfate solution by precipitating calcium fluoride and magnesium fluoride through the addition of manganese fluoride produced in steps (f) and (g); (c) separating the precipitated calcium fluoride and magnesium fluoride from the concentrated manganese sulfate solution to produce a first clarified manganese sulfate solution; (d) a first crystallization step comprising combining the first clarified manganese sulfate solution with a recycle manganese sulfate solution and with manganese sulfate seed crystals to produce combined manganese sulfate solution and seed crystals, and heating and mixing the combined manganese sulfate solution and seed crystals to produce a crystal suspension comprising manganese sulfate crystals in a saturated manganese sulfate solution; (e) separating the manganese sulfate crystals from the crystal suspension, producing a process bleed stream comprising the saturated manganese sulfate solution; (f) treating the process bleed stream with a fluoride reagent to produce a slurry comprising manganese fluoride and a bleed solution depleted in manganese; (g) separating the manganese fluoride from the depleted manganese bleed solution and transferring the manganese fluoride to the concentrated manganese sulphate solution for the removal of calcium and magnesium in step (b); (h) redissolving the manganese sulfate crystals from step (e) in water and removing undissolved solids to produce a second clarified manganese sulfate solution; (i) a second crystallization step comprising combining the second clarified manganese sulfate solution produced in step (h) with manganese sulfate monohydrate seed crystals, and heating and mixing the combination to produce a final manganese sulfate monohydrate crystal product in a saturated manganese sulfate solution; and (j) separating the final manganese sulfate monohydrate crystal product produced in step (i) from the saturated manganese sulfate solution to produce solid high purity manganese sulfate monohydrate crystals and the recycle manganese sulfate solution.

According to another aspect of the invention, there is provided a process for the purification of manganese sulfate solutions and precipitation of high purity manganese sulfate monohydrate crystals therefrom. There may be pretreatment of the solution by controlled pH adjustment and oxidation to materially remove aluminum, iron and base metals, including addition of a sulfide reagent if required to remove base metals to very low levels. Purification steps include: concentrating the manganese sulfate by evaporation or by addition of recycled crystals from the process, or both, as needed to obtain a concentration near saturation level at 50° C.; adding manganese fluoride solids generated separately from a process bleed stream in a quantity near stoichiometric to the combined calcium and magnesium concentration in the concentrated manganese sulfate solution; contacting said solution until the added manganese fluoride has been materially converted to calcium and magnesium fluoride solids and then removing and washing the resulting calcium and magnesium fluoride solids as a solid waste stream; combining the purified manganese sulfate solution with saturated manganese sulfate solution recycled from the final high purity manganese sulfate monohydrate product crystallization stage and seed crystals generated from saturated manganese sulfate solution rejected from the first manganese sulfate crystallization stage; heating the combined solution and seed crystals to a temperature above 80° C. while mixing, to generate a first manganese sulfate monohydrate crystal product; said product is separated from the remaining saturated manganese sulfate solution, which constitutes the process bleed stream; this product may be washed with a manganese sulfate solution to remove entrained salts, if required to achieve the required purity; redissolving the first manganese sulfate monohydrate crystal product in water to a concentration near saturation at 50° C. and removing undissolved impurities by filtration or other means of solid-liquid separation; combining the resulting high purity manganese sulfate solution with high purity manganese sulfate monohydrate seed crystals from the final product and heating the combined solution and crystals to a temperature above 80° C. while mixing, to generate a final manganese sulfate monohydrate crystal product; said product is separated from the remaining saturated manganese sulfate solution, which is recycled to the first manganese sulfate crystallization stage; the solid product constitutes the desired process product, meeting specified standards for impurity content. According to one aspect of the process, it also includes specified steps for the processing and treatment of the process bleed stream following a first crystallization stage, including: an initial evaporation and crystallization step to generate relatively high purity manganese sulfate for use as seed in the first crystallization stage and for recycle to the fluoride purification stage; addition of a fluoride reagent (which may be ammonium fluoride, ammonium hydrogen fluoride, hydrofluoric acid, sodium fluoride or other soluble fluoride reagent, in near-stoichiometric quantities with the remaining manganese in the bleed stream; scavenged manganese fluoride solids from the final bleed are also added as seed; the fluoride reagent is contacted with the solution and solids to precipitate manganese fluoride solids in equilibrium with a saturated manganese fluoride solution that also contains sulfate salts; separation and washing of solid manganese fluoride, which is then added to the main manganese sulfate stream as the fluoride reagent in the fluoride purification stage for removal of calcium and magnesium; evaporation of the recovered manganese fluoride and sulfate salt solution to recover additional manganese fluoride solids, which are added to the main manganese fluoride generation stage as seed crystals; and further evaporation and drying of the bleed stream to generate a low purity sulfate salt by-product, which also carries impurities not adequately removed in separate purification stages.

The generation of the manganese fluoride reagent from the bleed solution allows better utilization/recovery of lower grade manganese from the bleed. Separating the external fluoride source from the main process (e.g., adding ammonium fluoride in the bleed recycle) reduces the introduction of additional contaminants (i.e. ammonium salts) that would require extensive washing stages to remove from the final high purity product. This also reduces overall waste generation by allowing the ammonium salts, or other fluoride source, to be concentrated into a potentially useable byproduct stream.

Further aspects of the invention and features of specific embodiments of the invention are described below.

BRIEF DESCRIPTION OF THE DRAWING

FIG. 1 schematically is a schematic illustration of an embodiment of the process of the invention. In the FIGURE, devices intended for separation of a solid component from the liquid phase in a mixed solid and liquid stream are indicated by diagonally divided squares with the letters 'S' and 'L' indicating the solid and liquid phases, respectively.

DETAILED DESCRIPTION

Referring to FIG. 1, in one embodiment of the invention a partially purified leach solution 1 containing manganese sulfate, derived from the sulfuric acid leaching of a manganese-containing ore, or from waste from an intermediate mineral processing stream, is fed to a first evaporation stage 2. In some embodiments this leach solution 1 is derived from the acid leaching of a raw manganese ore in which an economically important fraction of the manganese content is present in the form of manganese carbonate minerals. In such embodiments this leach solution has been partially purified through sufficient neutralization, oxidation and precipitation to remove iron and aluminum dissolved in the leaching process, along with base metals, if present, including copper, nickel, cobalt, lead and zinc.

This leach solution 1 is combined in the first evaporation stage 2 with wash solution 10 returned from a later part of the process. In the first evaporation stage 2, water is removed by evaporation to produce a concentrated manganese sulfate solution 50 having a high concentration of manganese sulfate, for example a concentration in the range of 60 to 180 grams of manganese per liter of solution. Alternatively, the concentration may be near the saturation level at about 50° C. The evaporation also increases the concentrations of any impurities present in the solution.

In some embodiments of the process, the concentration of manganese sulfate in the leach solution 1 is increased by the addition of recycled manganese sulfate crystals from the purification process, instead of, or in addition to, evaporation.

The concentrated manganese sulfate solution 50 is then transferred to the calcium fluoride and magnesium fluoride precipitation vessel 3 where it is contacted with a reagent manganese fluoride stream 37 which is generated from the first crystallization process bleed stream 27 as a part of the bleed processing portion of the process, as explained below. The manganese fluoride stream 37 may be added as a solid, or dissolved in solution, or as a suspension of solids in a liquid medium. In one embodiment it is added as a suspension of precipitated solid particles in a saturated manganese fluoride solution. Optionally, lower purity manganese sulfate crystals 30, also recovered from the first crystallization bleed stream 27, may also be added to the calcium and magnesium fluoride precipitation vessel 3 as required to allow additional calcium and magnesium removal while maintaining high manganese and fluoride recovery from the bleed stream. Manganese fluoride is added in a 50 to 150% stoichiometric ratio to the total calcium and magnesium loading into the calcium and magnesium fluoride precipitation vessel 3.

After contacting for between 30 minutes and 6 hours, or alternatively between one and three hours, the resulting suspension 51 of calcium and magnesium fluoride solids in concentrated manganese sulfate solution is transferred from the calcium and magnesium fluoride precipitation vessel 3 to a solid-liquid separation device 4. This may be any suitable industrial device for separation of fine solids from liquid solutions, including, but not limited to devices that separate by settling, filtration or centrifuging. In some embodiments, this separation is achieved using a continuous centrifuge. Clarified manganese sulfate solution 11 is collected from the solid-liquid separation device 4 and transferred to the first crystallization stage 12.

Separated solids 5 from the solid-liquid separation device 4 are washed with process water 7 in a wash stage 6 and dewatered in a solid-liquid separation device 8. The wash stage 6 may constitute a separate repulp mix vessel or in some embodiments may constitute a displacement washing stage or section within the first solid-liquid separation device 4. Similarly, solid-liquid separation device 8 may be a separate suitable industrial separation device, including but not limited to settling vessels, filters and centrifuges, or in some embodiments may constitute a secondary separation stage or section within the first solid-liquid separation device 4. Wash solution 10 collected from the post-washing solid-liquid separation is returned to the first evaporation stage 2 for upgrading, while the washed calcium and magnesium fluoride solids 9 are collected for disposal, for return to the precipitation vessel 3 as seed particles, or for separate by-product recovery.

In some embodiments of the process, the steps of increasing the concentration of manganese sulfate in the leach solution, adding manganese fluoride and precipitating calcium fluoride and magnesium fluoride, and washing the precipitated solids to produce a solids waste stream, are combined into a single process stage.

In the first crystallization stage 12 the clarified manganese sulfate solution 11 is combined with mother liquor 26, i.e., a recycle manganese sulfate solution, from the second crystallization stage 21, and with manganese sulfate crystals 31 that are recovered from the first crystallization process bleed stream 27. The first crystallization stage 12 may be operated at a temperature between 50° C. and 125° C., alternatively between 75° C. and 95° C. The operation of this stage 12 may include evaporation in addition to crystallization, to increase or maintain the manganese sulfate concentration in solution beyond the level of solubility at the chosen crystallization temperature, and preferentially the combined streams feeding the first crystallization stage 12 will result in a crystallization mother liquor with a manganese sulfate concentration that is at or above its solubility at the chosen crystallization temperature.

In one embodiment, the first crystallization stage 12 consists of one or more heated mix vessels in which manganese sulfate mother liquor and seed crystals are heated and stirred, with or without evaporation, to produce a supersaturated state, resulting in the formation of fresh manganese sulfate crystals. The crystallization stage 12 may be operated in either batch or continuous mode. In one embodiment, it consists of 1 to 4 crystallizers operating continuously in series, with the total solution retention time in each crystallizer being between 1 and 6 hours, alternatively 2 to 4 hours.

After the first crystallization stage 12, the resulting crystal suspension 13 is transferred to a solid-liquid separation device 14. This may be any suitable industrial device for separation of fine solids from liquid solutions, including, but not limited to, devices that separate by settling, filtration or centrifuging. In one embodiment, this separation is achieved using a continuous centrifuge. Manganese sulfate crystals 15 recovered from this solid-liquid separation device 14 may be washed using a concentrated manganese sulfate solution before being transferred to a second crystallization stage 21, while the separated mother liquor and wash solution, i.e., the process bleed stream 27, is transferred to the bleed processing circuit.

The manganese sulfate crystals 15 generated in the first crystallization stage 12 are dissolved in a redissolution tank 16 by mixing with process water 7 in a ratio allowing a minimum of 80% of the manganese sulfate, alternatively 100% of the manganese sulfate, to be dissolved at a dissolution temperature in the range of 10° C. to 65° C., to produce the second crystallization mother liquor 17. The concentration of manganese sulfate crystal product in the mother liquor 17 may be near saturation at about 50° C.

After the dissolution, the second crystallization mother liquor 17 is transferred to a solid-liquid separation device 18, which may be any suitable industrial device for separation of fine solids from liquid solutions, including, but not limited to devices that separate by settling, filtration or centrifuging. In one embodiment, this separation is achieved using a pressure filter. This device 18 separates any undissolved solids 19 from the clarified mother liquor 20. The separated solids 19 may be disposed as a waste stream or be returned to an earlier stage of the process, depending on their composition.

The clarified mother liquor 20 is then transferred to the second crystallization stage 21 where it is combined with a fraction 25 of the final pure HPMSM crystal product 24, which is added to seed crystal formation. The second crystallization stage 21 may be operated at a temperature between 50° C. and 125° C., alternatively between 75° C. and 95° C., alternatively above 80° C. The operation of this stage 21 may include evaporation in addition to crystallization to increase or maintain the manganese sulfate concentration in solution beyond the level of solubility at the chosen crystallization temperature, and preferentially the combined mother liquor and seed streams feeding the second crystallization stage will result in a manganese sulfate concentration in solution which is above its solubility at the chosen crystallization temperature.

In one embodiment, the second crystallization stage 21 consists of one or more heated mix vessels in which manganese sulfate mother liquor and seed crystals are heated and stirred, with or without evaporation, to produce a supersaturated state, resulting in the formation of fresh manganese sulfate crystals. The crystallization 21 may be operated in either batch or continuous mode. In one embodiment, it consists of 1 to 4 crystallizers operating continuously in series, with the total solution retention time in each crystallizer being between 1 and 6 hours, alternatively between 2 to 4 hours.

After the second crystallization stage 21, the resulting suspension 22, consisting of high purity manganese sulfate monohydrate (HPMSM) crystals suspended in saturated mother liquor, is transferred to a solid-liquid separation device 23. This may be any suitable industrial device for separation of fine solids from liquid solutions, including, but not limited to, devices that separate by settling, filtration or centrifuging. In one embodiment, this separation device 23 is a continuous centrifuge. Mother liquor 26 separated in this device 23 is returned to the first crystallization stage 12 for further processing, while the crystals recovered from the separation constitute the final HPMSM product 24. A fraction 25 of this product is returned to the second crystallization stage 21 as seed crystals.

Mother liquor and wash water that is separated in the solids-liquid separation device 14 from the first crystallization stage crystal product 15 constitutes the process bleed stream 27 along with any initial crystals that may be separated at the beginning of crystallization. This process bleed stream 27 is further processed to prepare intermediate products and to reject impurities. The process bleed stream 27 may be transferred to an evaporation vessel 28, which allows the crystallization of lower purity manganese sulfate crystals that are suspended in a reduced mother liquor with concentrated impurities.

The suspension 52 produced in the evaporation vessel 28 is transferred to a solid-liquid separation device 29, which may be any suitable industrial device for separation of fine solids from liquid solutions, including, but not limited to devices that separate by settling, filtration or centrifuging. In one embodiment, this separation device 29 is a continuous centrifuge. Debrined crystals separated in this device may be used as seed crystals 31 in the first crystallization stage 12. The debrined crystals 30 may also be transferred to the calcium and magnesium fluoride precipitation vessel 3 to allow additional calcium and magnesium impurities to be removed.

Impure, concentrated bleed mother liquor 32 collected from the solid-liquid separation device 29 is then transferred to a manganese fluoride precipitation vessel 33, where it is dosed with a soluble fluoride reagent 34. Such reagent 34 may include, but is not limited to, one or more of ammonium fluoride, ammonium hydrogen fluoride, sodium fluoride, barium fluoride and hydrofluoric acid. In one embodiment, the reagent 34 is ammonium fluoride. The reagent is added at a rate to produce a stoichiometric ratio of fluoride to the manganese in solution of 1.5:1 to 2.5:1, alternatively a ratio in the range 1.8:1 to 2.2:1. Solid manganese fluoride 41 precipitated later in the bleed processing circuit and separated in a solid-liquid separation device 40, may also be added to the manganese fluoride precipitation vessel 33 to act as seed for manganese fluoride crystal formation. The fluoride reagent addition 34 results in a concentration of manganese fluoride in this vessel 33 that exceeds saturation, resulting in the formation of solid manganese fluoride crystals during a vessel retention time of 0.5 to 8 hours, alternatively 1 to 4 hours. This reaction may be carried out at a temperature in the range of 0° C. to 110° C., alternatively 40° C. to 80° C.

The slurry 35 resulting from manganese fluoride crystallization in the manganese fluoride precipitation vessel 33 is transferred to a solid-liquid separation device 36, which may be any suitable industrial device for separation of fine solids from liquid solutions, including, but not limited to, devices that separate by settling, filtration or centrifuging. In one embodiment, this separation is achieved using a continuous centrifuge. A wash cycle may be added to this solid-liquid separation device 36 by adding fresh water 7 to the recovered crystal solids prior to discharging. This wash water may be added at a temperature in the range of 0° C. to 100° C., alternatively 40° C. to 80° C.

The washed manganese fluoride crystals 37 discharged from this solid-liquid separation device 36 are collected and added in a controlled manner to the calcium and magnesium fluoride precipitation vessel 3 in a predetermined ratio to the calcium and magnesium concentrations in the feed to that vessel, as described above.

A solution 38 comprising concentrated manganese fluoride mother liquor and wash water from the solid-liquid separation device 36 is transferred to an evaporation stage 39, where additional water is removed from the solution, resulting in manganese fluoride concentrations again exceeding the level of solubility, causing precipitation of additional manganese fluoride crystals. Other crystals may also form at this stage, including, but not limited to manganese sulfate, ammonium sulfate, or salts of other cations that may be introduced with the fluoride reagent 34 added to the manganese fluoride precipitation vessel 33. In one embodiment, these crystals comprise predominantly manganese fluoride.

The slurry 53 resulting from the evaporation stage 39 is transferred to a solid-liquid separation device 40, which may be any suitable industrial device for separation of fine solids from liquid solutions, including, but not limited to devices that separate by settling, filtration or centrifuging. In one embodiment, this separation is achieved using a continuous centrifuge. Solids 41 collected on this centrifuge 40 would preferentially have a high content of manganese fluoride and may be transferred to the manganese fluoride precipitation vessel 33 to act as seed for the precipitation of manganese fluoride crystals.

Saturated liquid 42 recovered from the solid-liquid separation device 40 is transferred to a final evaporation stage 43 where remaining water is removed to precipitate a final bleed solid product 44. This solid product constitutes a salt by-product containing a fraction of process impurities and unrecovered manganese salts. In one embodiment, this salt by-product is primarily ammonium sulfate with impurities that include manganese sulfate and alkaline and alkaline earth sulfate salts.

In some embodiments of the process, a fraction of the process bleed stream 27 is returned, without additional evaporation or crystallization, to the manganese sulfate solution 1 for processing in the evaporation step, and/or to the concentrated manganese sulfate solution 50 for processing in the step of removing calcium and magnesium by precipitation.

EXAMPLE

Two samples of a leach solution produced by acid leaching of a manganese-containing ore were assayed. The pH was measured and the following elements were measured (in mg/kg or ppm): Al, Ca, Co, Fe, K, Mg, Mn, Na, Ni and Zn. The assay results are shown at lines A1 and A2 in Table 1 below.

Preliminary purification steps were conducted on the two samples, consisting of neutralization at 80 to 90° C. with calcium carbonate addition to a target pH of 5.5. The filtrates of the samples were assayed and the results are shown at lines B1 and B2, respectively, in Table 1.

12

90° C. as crystals formed. After this second crystallization step, the resulting slurry contained 0.28 kg of concentrated manganese sulfate solution and 0.11 kg of pure $MnSO_4 \cdot H_2O$ crystals. The results of the assay of the slurry are shown at line F1 and the results of the assay of the crystals at line F2 in Table 1.

The slurry from the second crystallization was subjected to solid-liquid separation to produce the final HPMSM product. The results of the assay of the dried HPMSM product are shown at line G in Table 1.

An assay was also conducted on the bleed stream 27 coming from the solid-liquid separation 14 after the first crystallization step. The results of the assay of the bleed stream are shown at line H in Table 1. The bleed solution 52 after the evaporation 28 had a similar concentration of manganese, with all other components being concentrated proportionately to the amount of water removed.

In this working example, the bleed stream from the first crystallization, or the solution resulting from the evaporation of that stream, was fed to a contacting vessel where ammonium fluoride was added in stoichiometric proportion to the manganese present in solution. Recovered manganese fluoride was also added to seed the formation of fresh manganese fluoride. In this test, 360 g of the bleed stream feed solution was contacted with 68 g of ammonium fluoride, resulting in a slurry with 275 g of solution and 67 g of solids. The results of the assay of the solution are shown at line I and the results of the assay of the solids at line J in Table 1.

TABLE 1

| | | | | | | Assay (mg/kg or ppm) | | | | | | | |
|---|---|---|---|---|---|---|---|---|---|---|---|---|---|
| | pH | Al | Ca | Co | Fe | K | Mg | Mn | Na | Ni | Zn | F | NH₃ as N |
| A1 | 2.51 | 568 | 526 | 1.9 | 7405 | 130 | 1431 | 50357 | 272 | 4.3 | 1.9 | | |
| A2 | 2.06 | 959 | 540 | 5.2 | 10208 | 154 | 1762 | 51158 | 373 | 15.6 | 6.7 | | |
| B1 | 5.51 | <4 | 495 | <2 | <4 | 48 | 1629 | 50302 | 230 | <2 | <2 | | |
| B2 | 6.01 | <5 | 638 | <2.5 | <5 | 77 | 2309 | 61638 | 411 | 4 | <2.5 | | |
| C | 5.84 | <4 | 539 | 2.6 | <4 | 98.4 | 3066 | 93348 | 481 | <2 | <2 | | |
| D | 5 | <4 | 89.3 | 3.7 | <4 | 82 | 196 | 98391 | 420 | 3.4 | <2 | 1260 | |
| E1 | 2.48 | <4 | 357 | 3.9 | <4 | 185 | 668 | 123991 | 1271 | 6.9 | <2 | 459 | |
| E2 | — | <5 | 246 | <2.5 | <5 | 121 | 444 | 323424 | 752 | 4.1 | <2.5 | 865 | |
| F1 | 2.05 | 0.9 | 113.2 | <2 | <4 | 37.5 | 25.1 | 129577 | 99.8 | <2 | <2 | 11 | |
| F2 | — | <5 | 29.9 | <2.5 | <5 | <25 | <5 | 325304 | 64.7 | <2.5 | <2.5 | 107 | |
| G | — | <5 | 40.3 | <2.5 | <5 | <25 | <5 | 341366 | 71.1 | <2.5 | <2.5 | 104 | |
| H | 2.48 | <4 | 357 | 3.9 | <4 | 185 | 668 | 123991 | 1271 | 6.9 | <2 | 459 | |
| I | 5.09 | <4 | 11.6 | 2.5 | <4 | <20 | <4 | 24517 | 1022 | 2.8 | <2 | 3986 | 50704 |
| J | | <25 | 1304 | <5 | 27.3 | 722 | 3006 | 415871 | 113 | 36.2 | <5 | 415950 | |

The B1 filtrate sample was subjected to evaporation to increase its concentration, to a target of approximately 100 g manganese per kg of filtrate. The results of the assay of the concentrated solution are shown at line C in Table 1.

The concentrated solution was mixed with 105% stoichiometric manganese fluoride to precipitate Ca and Mg, and the solids were removed by filtration. The results of the assay of the filtrate are shown at line D in Table 1.

A first crystallization step was conducted on the filtrate (D) from the precipitation step. 1.5 kg of the purified and evaporated solution was fed to the crystallizer and evaporated at 90° C. until crystals formed. After crystallization, the resulting slurry contained 0.5 kg of concentrated manganese sulfate solution and 0.3 kg of impure $MnSO_4 \cdot H_2O$ crystals. The results of the assay of the slurry are shown at line E1 and the results of the assay of the crystals at line E2 in Table 1.

The crystals (E2) were redissolved, with any insoluble impurities removed by filtration, and 0.6 kg of feed solution from the redissolution was fed to a crystallizer and mixed at Although a preferred embodiment of the invention has been disclosed for purposes of illustration, it should be understood that various changes, modifications and substitutions may be incorporated in the embodiment without departing from the spirit of the invention, which is defined by the claims which follow.

The invention claimed is:

1. A process for purifying a manganese sulfate solution and precipitating high purity manganese sulfate monohydrate crystals therefrom, comprising the steps of:

(a) increasing the concentration of manganese sulfate in the manganese sulfate solution to produce a concentrated manganese sulfate solution;

(b) removing calcium and magnesium from the concentrated manganese sulfate solution by precipitating calcium fluoride and magnesium fluoride through the addition of manganese fluoride produced in steps (f) and (g);

(c) separating the precipitated calcium fluoride and magnesium fluoride from the concentrated manganese sulfate solution to produce a first clarified manganese sulfate solution;

(d) a first crystallization step comprising combining the first clarified manganese sulfate solution with a recycle manganese sulfate solution and with manganese sulfate seed crystals to produce combined manganese sulfate solution and seed crystals, and heating and mixing the combined manganese sulfate solution and seed crystals to produce a crystal suspension comprising manganese sulfate crystals in a saturated manganese sulfate solution;

(e) separating the manganese sulfate crystals from the crystal suspension, producing a process bleed stream comprising the saturated manganese sulfate solution;

(f) treating the process bleed stream with a fluoride reagent to produce a slurry comprising manganese fluoride and a bleed solution depleted in manganese;

(g) separating the manganese fluoride from the depleted manganese bleed solution and transferring the manganese fluoride to the concentrated manganese sulphate solution for the removal of calcium and magnesium in step (b);

(h) redissolving the manganese sulfate crystals from step (e) in water and removing undissolved solids to produce a second clarified manganese sulfate solution;

(i) a second crystallization step comprising combining the second clarified manganese sulfate solution produced in step (h) with manganese sulfate monohydrate seed crystals, and heating and mixing the combination to produce a final manganese sulfate monohydrate crystal product in a saturated manganese sulfate solution; and (j) separating the final manganese sulfate monohydrate crystal product produced in step (i) from the saturated manganese sulfate solution to produce solid high purity manganese sulfate monohydrate crystals and the recycle manganese sulfate solution.

2. A process according to claim 1, wherein step (a) comprises evaporation.

3. A process according to claim 1, wherein step (a) comprises adding manganese sulfate crystals to the concentrated manganese sulfate solution.

4. A process according to claim 1, wherein step (a) increases the concentration to a concentration in the range of 60 to 180 g of manganese per liter of solution.

5. A process according to claim 1, wherein the manganese fluoride is added in a 50% to 150% stoichiometric ratio to the total calcium and magnesium content present.

6. A process according to claim 1, wherein the concentrated manganese sulfate solution is contacted with the manganese fluoride for a time period in the range of 30 minutes to 6 hours.

7. A process according to claim 1, wherein step (c) is done by one of settling, filtration and centrifuging.

8. A process according to claim 1, further comprising washing the precipitated calcium fluoride and magnesium fluoride separated in step (c) with water, collecting the wash solution and returning it to the magnesium sulfate solution for processing in step (a).

9. A process according to claim 1, wherein the recycle manganese sulfate solution used in step (d) is produced in step (j).

10. A process according to claim 1, wherein the manganese sulfate seed crystals used in step (d) are generated from the process bleed stream produced in step (e).

11. A process according to claim 1, wherein in step (d) the heating is done to a temperature in the range of 50 to 125° C.

12. A process according to claim 1, wherein in step (d) the heating is done in a crystallizer or in two to four crystallizers connected in series, with a retention time in each crystallizer in the range of 1 to 6 hours.

13. A process according to claim 1, wherein during step (d) evaporation is done to increase or maintain the concentration of manganese sulfate in the manganese sulfate solution.

14. A process according to claim 1, further comprising washing the process bleed stream produced in step (e) with a manganese sulfate solution to remove entrained salts.

15. A process according to claim 1, wherein in step (h), redissolving the manganese sulfate crystals in water comprises dissolving 80% to 100% of the manganese sulfate crystals in water at a temperature in the range of 10° C. to 65° C.

16. A process according to claim 1, wherein the manganese sulfate monohydrate seed crystals used in step (i) are a fraction of the solid high purity manganese sulfate monohydrate crystals produced in step (j).

17. A process according to claim 1, wherein in step (i) the heating is done to a temperature to a temperature in the range of 50 to 125° C.

18. A process according to claim 1, wherein in step (i) the heating is done in a crystallizer or in two to four crystallizers connected in series, with a retention time in each crystallizer in the range of 1 to 6 hours.

19. A process according to claim 1, wherein in step (f), the fluoride reagent is added to a concentrated manganese sulfate solution produced from the process bleed stream, to produce the manganese fluoride slurry.

20. A process according to claim 19, wherein the fluoride reagent is added to produce a stoichiometric ratio of fluoride to manganese in the manganese fluoride slurry in the range of 1.5:1 to 2.5:1.

21. A process according to claim 19, wherein a reaction time for the production of the manganese fluoride slurry is in the range of 0.5 to 8 hour.

22. A process according to claim 19, wherein the production of the manganese fluoride slurry is carried out at a temperature in the range of 0° C. to 110° C.

23. A process according to claim 1, further comprising processing the process bleed stream by evaporation and solid-liquid separation to produce solid manganese sulfate crystals and a concentrated process bleed stream.

24. A process according to claim 23, further comprising using the produced solid manganese sulfate crystals in step (b) and/or step (d).

25. A process according to claim 23, further comprising adding the fluoride reagent and manganese fluoride solids to the concentrated process bleed stream to produce the slurry comprising manganese fluoride solids and a bleed solution depleted in manganese.

26. A process according to claim 1, wherein the fluoride reagent is selected from the group consisting of ammonium fluoride, ammonium hydrogen fluoride, hydrofluoric acid, and sodium fluoride.

27. A process according to claim 1, further comprising evaporating the depleted manganese fluoride solution to produce a slurry and applying solid-liquid separation to the slurry to produce manganese fluoride solids and a final process bleed stream.

28. A process according to claim 27, further comprising using the produced manganese fluoride solids as seed crystals with the fluoride reagent to generate manganese fluoride crystals.

29. A process according to claim 1, wherein a fraction of the process bleed stream produced in step (e) is returned, without additional evaporation or crystallization, to the manganese sulfate solution for processing in step (a) and/or to the concentrated manganese sulfate solution for processing in step (b).

* * * * *